(No Model.)

J. JACOBSON.
TRANSPARENCY.

No. 369,059. Patented Aug. 30, 1887.

Witnesses,
Jas. J. Maloney.
M. E. Hill.

Inventor,
John Jacobson,
by Jos. P. Livermore
Att'y

UNITED STATES PATENT OFFICE.

JOHN JACOBSON, OF BOSTON, MASSACHUSETTS.

TRANSPARENCY.

SPECIFICATION forming part of Letters Patent No. 369,059, dated August 30, 1887.

Application filed March 7, 1887. Serial No. 229,941. (No model.)

*To all whom it may concern:*

Be it known that I, JOHN JACOBSON, of Boston, county of Suffolk, State of Massachusetts, have invented an Improvement in Transparencies, of which the following description, in connection with the accompanying drawings, is a specification, like letters on the drawings representing like parts.

The object of my invention is to produce at moderate cost a transparency that can be used in place of stained glass or photographic transparencies and will produce an equally good effect.

Attempts have been made to produce a cheap imitation of colored glass by printing on thin transparent paper and then attaching the same to plain uncolored window-glass; but so far as I know it has been impossible up to the present time to produce in this manner anything but the simplest designs. An ordinary color-print or a chromo or a photograph or an engraving on paper produces a very weak effect when the paper is rendered transparent or translucent by filling its pores and is subjected to transmitted light, and is wholly inadequate to produce a strong deep picture when used as transparency or viewed by transmitted light. I have discovered that the effect of such a print or picture can be strengthened and the effect of stained glass faithfully reproduced by using two or more copies of the print upon paper or other medium—that is, after printing—rendered transparent or translucent by filling its pores, and that the effect of such manifold prints when placed against or between plates of plain uncolored glass can scarcely be distinguished from stained glass of the highest quality.

It is necessary in order to obtain good results in colored printing to use rather thick and soft paper in order to take up the colors properly, and such paper can be used to advantage in producing transparencies in accordance with my invention, which consists in a transparency composed of two or more copies of the same print or picture on paper, or any other suitable medium rendered transparent and matched or registered together, so that the different copies exactly coincide and together afford sufficient strength to the picture when viewed by transmitted light. The said copies when thus registered or matched together are preferably inclosed between two plates of glass, which, when placed in a window-sash or other suitable frame, will, with the inclosed transparent pictures, give the effect of a costly design in stained glass.

Figure 1:
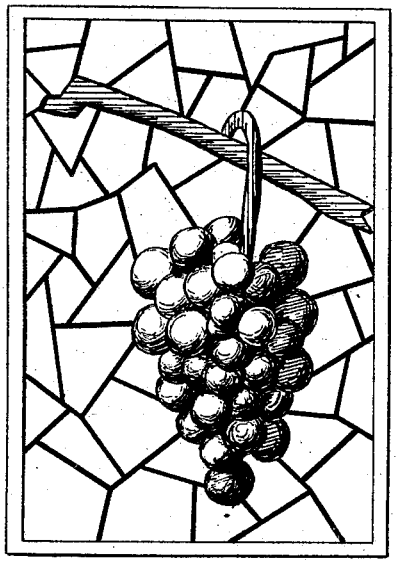
Figure 2:
Figure 3:
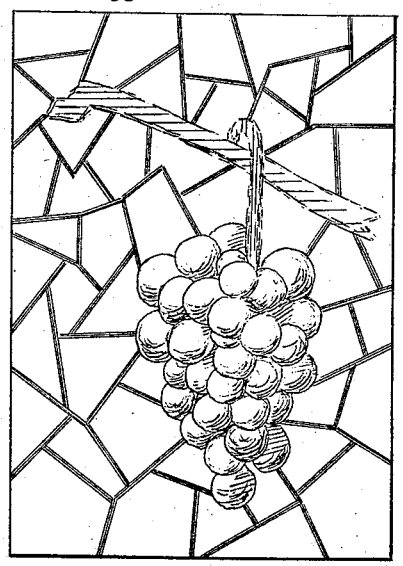

Figure 1 is a face view of a transparency embodying this invention; Fig. 2, an edge view thereof; Fig. 3, a face view of one of the copies of the design as seen by transmitted light, and Figs. 4 and 5 details representing the method that may be used to properly register the different copies together.

In making a colored transparency in accordance with this invention two or more copies—such as represented at $a$, Fig. 3—of the design are carefully printed by any suitable or usual process of color-printing, preferably using a somewhat soft and thick paper and making as strong a print as is practicable. Then the paper or basis on which the design is printed is rendered transparent by filling or saturating its fiber with an oil or wax in any suitable or usual manner—as, for example, by dipping it in melted paraffine. The paper, when treated in this manner, becomes translucent, and when a sufficient number of layers of the same are viewed in transmitted light they give in the uncolored parts the effect of white or opalescent glass and in the colored parts the effect of a clear stained glass of the same color; but a single print, although made in the strongest colors that can be produced by ordinary printing, will be exceedingly pale or thin and weak and of no value for decorative purposes, as shown in Fig. 3.

In most cases two or three copies carefully matched or registered together will give the desired strength and depth of color, (see Fig. 1,) so that it is difficult to distinguish them from stained or colored glass, and the most beautiful pictorial effects can be produced in this manner.

Figure 4:
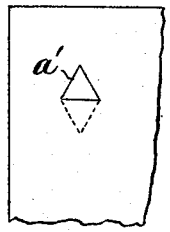
Figure 5:

In order to insure the proper registering of the different copies they may be provided with registering marks or notches $a'$, forming tongues pointing in different directions on the different layers or sheets to be matched together, so that by interlocking the said tongues, as shown in Figs. 4 and 5, the sheets will be accurately held in proper relation to one another, or they may be matched by the eye and fastened together by cement or otherwise.

The different sheets or layers when properly matched together will preferably be placed between panes of glass, $b$ $b'$, as best shown in Fig. 2, which may be placed in a window-frame or other suitable frame and used as a substitute for a stained or colored glass window.

The lines to indicate the leading of the window may either be printed on the design in black or in some cases it may be preferable to cut the design for the leading by dies from thin black opaque card-board, sheet metal, or other material, which will then be fastened in the proper position on the manifold copies of the color-design.

It is obvious that photographs, alberttypes, or other prints or engravings may be prepared in the same manner and will produce the effect of a photographic transparency at much less cost.

I claim—

1. A transparency composed of two or more copies of a print or picture on a translucent medium matched or registered together with the one design coinciding with the other, substantially as and for the purpose described.

2. The combination of two or more copies of a print or design on a translucent medium placed together with the design on one copy coinciding with that on the other, with two panes or plates of glass embracing said copies between them, substantially as described.

In testimony whereof I have signed my name to this specification in the presence of two subscribing witnesses.

JOHN JACOBSON.

Witnesses:
M. F. DICKINSON, Jr.,
JOS. P. LIVERMORE.